US006868647B2

(12) United States Patent
Poldmaa

(10) Patent No.: US 6,868,647 B2
(45) Date of Patent: Mar. 22, 2005

(54) ROOF ANCHOR METHOD AND APPARATUS

(76) Inventor: Arvo Poldmaa, 16 Moola Street, Hawks Nest NSW 2324 (AU)

( * ) Notice: Subject to any disclaimer, the term of this patent is extended or adjusted under 35 U.S.C. 154(b) by 0 days.

(21) Appl. No.: 10/369,046

(22) Filed: Feb. 19, 2003

(65) Prior Publication Data

US 2003/0182893 A1 Oct. 2, 2003

Related U.S. Application Data

(63) Continuation of application No. PCT/AU01/01013, filed on Aug. 15, 2001.

(51) Int. Cl.[7] .......................... E04D 15/00; E04G 21/32; F16B 21/02

(52) U.S. Cl. ................................ 52/749.12; 52/745.21; 52/127.5; 52/26; 182/45; 248/237; 248/339; 411/340

(58) Field of Search ............................ 52/24–27, 127.5, 52/747.1, 749.12, 745.21, 698, DIG. 1, 514, 11, 12, 13, 14, 15, 16; 248/237, 148, 339, 343, 536, 317, 505, 508; 182/3, 45; 411/340, 345–346; 403/408.1; 119/786

(56) References Cited

U.S. PATENT DOCUMENTS

| | | | | | |
|---|---|---|---|---|---|
| 978,380 | A | * | 12/1910 | Kennedy | 411/340 |
| 1,035,399 | A | * | 8/1912 | Wheeler, Jr. | 411/346 |
| 3,605,547 | A | * | 9/1971 | Millet | 411/344 |
| 4,226,058 | A | * | 10/1980 | Riley | 52/27 |
| 4,297,823 | A | * | 11/1981 | Keisler | 52/514 |
| 5,007,223 | A | * | 4/1991 | Holland | 52/745.21 |
| 5,143,171 | A | * | 9/1992 | Glynn et al. | 182/3 |
| 5,730,245 | A | * | 3/1998 | Conway | 182/3 |
| 5,749,687 | A | * | 5/1998 | Kilgore, III | 411/29 |
| 5,850,889 | A | * | 12/1998 | Rexroad et al. | 182/3 |
| 6,036,149 | A | * | 3/2000 | Del Pino et al. | 248/231.91 |
| 6,287,065 | B1 | * | 9/2001 | Berlin | 411/340 |

FOREIGN PATENT DOCUMENTS

| | | |
|---|---|---|
| GB | 1 541 016 | 2/1979 |
| GB | 2 219 826 A | 12/1989 |
| JP | 10-219936 A | 8/1998 |
| WO | WO 94/28268 A1 | 12/1994 |

* cited by examiner

*Primary Examiner*—Winnie Yip
(74) *Attorney, Agent, or Firm*—Akin Gump Strauss Hauer & Feld, LLP

(57) ABSTRACT

A method is provided for mounting a roof anchor (10) on a roof support structure (30) having an underside surface (32), the roof fully or partially covered with roof covering material (39), the roof anchor (10) including an attachment means (12) and a shaft (14), the method including the steps of: a) making a first hole (50) in the covering material (39) and the roof support structure (30), which first hole (50) is capable of receiving the shaft (14); b) forming an aperture (38) in the covering material (39) adjacent the first hole (50) and the roof support structure (30); c) inserting an anchor block (20), having a second hole (22) capable of fixedly engaging the shaft (14), through the aperture (38) and locating the anchor block (20) at the underside surface (32) such that the first and second holes (50, 22) are in registry; and d) inserting the shaft (14) through both the first and second holes (50, 22) whereby to fixedly engage the roof anchor (10) to the anchor block (20), such that the roof anchor (10) is mounted on the roof support structure (30).

10 Claims, 7 Drawing Sheets

Fig. 2
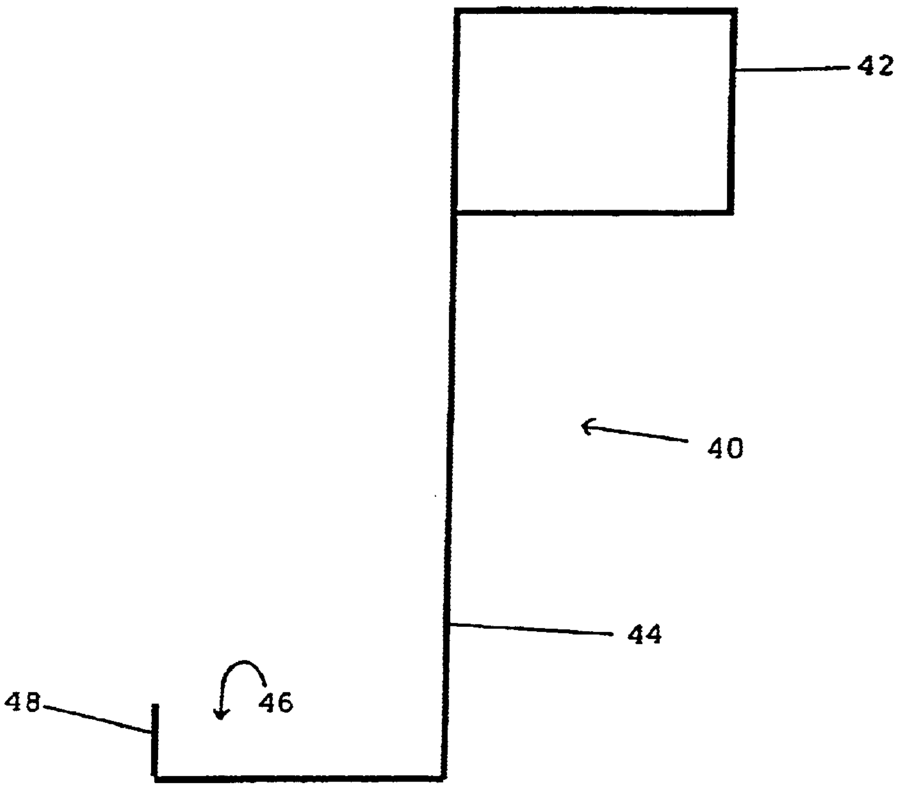
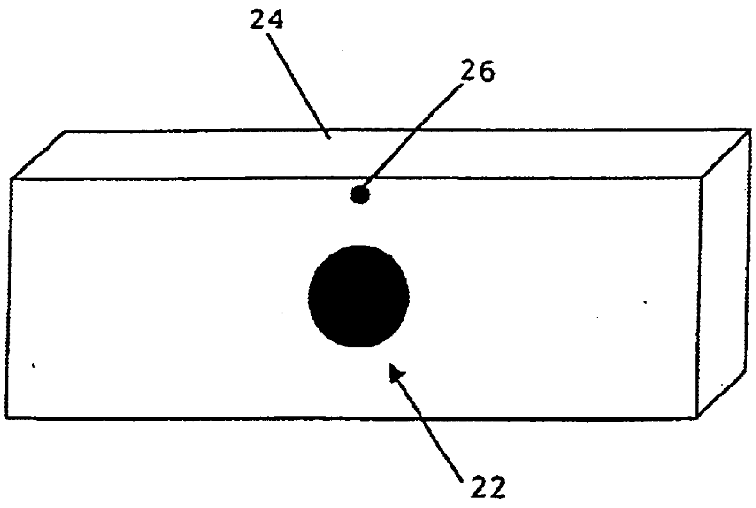
Fig. 3

ROOF ANCHOR METHOD AND APPARATUS

CROSS-REFERENCE TO RELATED APPLICATION

This application is a Continuation of International Application No. PCT/AU01/01013, filed Aug. 15, 2001, which was published in the English language on Feb. 21, 2002, under International Publication No. WO 02/14625 A1 and the disclosure of which is incorporated herein by reference.

TECHNICAL FIELD

The present invention relates to roof anchors for attaching devices, apparatus or equipment to a roof support structure and, more particularly, to a method or apparatus for installing a roof anchor to the structure. The devices, apparatus or equipment to be attached may include roof mounted fittings such as water heaters or solar panels, safety equipment such as a safety harnesses, ropes or other safety devices adapted to secure a roof worker, such as a safety barrier or fence.

BACKGROUND ART

Conventional roof anchoring devices require access to a roof support structure such as a purin or rafter. Direct access to the support structure is generally required and involves mounting the roof anchor prior to the application of the external covering of the roof such as tiles, sarking or sheeting so that, on application of the external covering to the support structure, the roof anchor extends proud of the external covering.

If the external covering has already been applied to the roof support structure, then at least one unit of the external covering such as a tile or singular sheet must be removed to provide access to the roof support structure. Where part of the external covering must be removed to provide access to the roof support structure, such as for example will be the case for a completed building to which repairs, improvements or renovations are required, this may be impractical or inconvenient. For example, where large units of sheeting form the external covering of the roof, considerable time and effort may need to be expended to remove a single unit to gain access to the roof support structure.

It is an object of the present invention to provide a method and apparatus which ameliorates one or more of the above-mentioned disadvantages associated with the prior art.

The above description of the prior art is not intended to be, nor should it be interpreted as, an indication of the common general knowledge pertaining to the invention, but rather to assist the person skilled in the art in understanding the developmental process which lead to the invention.

DISCLOSURE OF THE INVENTION

Accordingly, in one aspect of the invention there is provided a method for mounting a roof anchor on a roof support structure having an underside surface, said roof filly or partially covered with roof covering material, said roof anchor including an attachment means and a shaft, said method including the steps of:

a) Making a first hole in the covering material and the roof support structure, which first hole is capable of receiving the shaft;

b) Forming an aperture in the covering material adjacent the first hole and the roof support structure;

c) Inserting an anchor block, having a second hole capable of fixedly engaging the shaft, through the aperture and locating the anchor block at the underside surface such that the first and second holes are in registry; and d) Inserting the shaft through both the first and second holes whereby to fixedly engage the roof anchor to the anchor block, such that the roof anchor is mounted on the roof support structure.

The roof anchor includes any suitable means for anchoring a safety harness, rope, harness or like means of securing a workman to the roof support structure to enable to workman to work safely on the roof. The roof anchor may stand proud of the external covering of the roof to present attachment means suitable for securing a safety harness, rope or the like thereto.

The attachment means may comprise one or more salients to which a rope or cable may be secured. The salient may terminate in a bulbous portion to prevent the rope, etc. from working free of the salient. In more conventional roof anchors, the attachment means comprises a U- or eye bolt to which the safety harness is securely connected.

An example of a roof anchor which may be used in the present invention is described in international application No. PCT/AU98/00968 the entire contents of which are incorporated herein by reference.

The shaft may be integrally formed with the attachment means or may be made separately and fixed to the attachment means prior to application. The attachment means may be threadably fixed to the shaft as is standard in the art whereby the fixing means includes a male threaded portion and a female threaded socket portion. Preferably, the male threaded portion forms part of the shaft and the female threaded socket portion is found in the attachment means. The threaded socket may be machined after the attachment means is formed or may be formed by a threaded insert securable to a pre-existing bore in the attachment means.

The shaft may be in the form of a bolt the free end of which is threaded for fixed engagement to the anchor block. Alternatively, the shaft may include at its free end spreadable wings adapted for insertion through the second hole thereafter spreadable to engage the underside of the anchor block. However, in the preferred form the shaft includes a threaded bolt section adapted for threaded engagement in the second hole of the anchor block.

The roof support structure may include a rafter, purlin or any other form of the roof framework or truss capable of supporting the potentially considerable load which may be placed on the structure in the event of workman falling and relying on the arrangement of the present invention to arrest his fall. The structure may be a purlin. The purlin may have a solid rectangle, C- or channel cross-sectional shape. In the case of a C-purlin, it will be appreciated by a person skilled in the art that only a relatively short shaft may be necessary to extend through the covering material and, the portion of the purlin to which the roof anchor is to be mounted through to the anchor block. Where the roof anchor is to be mounted onto a roof support structure of considerable thickness, such as may be the case where a solid wooden beam is involved, the shaft will need to be correspondingly of longer dimensions to extend through the structure to its underside surface.

The anchor block may be planar and may be circular, square or any other geometrical shape. Preferably the anchor block is elongate in plan view whereby the block is longer in one dimension in proportion to its width. Accordingly, the anchor block may be of a flat oval shape or, more preferably, may have a planar rectangular shape. Preferably, the anchor block is sufficiently narrow in width to require only a small aperture to be formed in the covering material to enable the anchor block's insertion therethrough and sufficiently long lengthwise to sit neatly against the underside surface of the top arm of a C-purlin. The anchor block is preferably prevented from rotation in a horizontal plane where the roof anchor is to be mounted on, for example, a C-purlin.

It will be appreciated, however, by the person skilled in the art that there are a large variety of configurations and dimensions of anchor blocks which would satisfy the functional requirement of providing a means for fixed engagement to the free end of the shaft. Notwithstanding this, in a preferred form the anchor block includes a threaded bore suitable to receive a threaded bolt for fixed engagement thereto. The threaded bore may be formed by an insert when forming the anchor block by moulding or may be achieved by means of placing a threaded insert into a cylindrical or otherwise scored bore. The threaded bore may be formed by machining as is standard in the art.

Preferably, the method of the invention is carried out using a hand tool adapted to control the orientation of the anchor block. The hand tool may be elongate and may include a handle and an elongate rod capable of supporting the anchor block at its free end.

The rod may hold the anchor block substantially immovable relative to the rod by means of a clamp. The clamp may be adapted to rotate the anchor block to determine its orientation. Preferably, the rod is provided with a hook end upon which the anchor block may be suspended. The anchor block may be capable of swivelling relative to the rod whereby to enable the anchor block to be inserted through the aperture in one orientation and, once having cleared the aperture to swivel to a second orientation under the influence of gravity, for example.

The anchor block may include a pivot hole capable of receiving the free end of the rod loosely therein whereby to allow the anchor block to freely rotate about the free end. The pivot hole is preferably located at a point which is a centre of balance for the block whereby, when suspended using the pivot hole the anchor block assumes an orientation suitable to facilitate its placement against the underside surface.

The rod may terminate in a number of configurations. Preferably the rod terminates in a portion extending in a direction traverse or opposite to a main portion of the rod connected to the handle. This may allow the anchor block to be manoeuvred around interior roof structures to place the block anchor in position at the underside surface. Such an interior structure may include a downwardly extending portion of a C-purlin.

The aperture is preferably formed by cutting a hole through the covering material. The cutting apparatus will vary depending on the type of covering material. For example, the aperture may be formed by a cylindrical saw or a jigsaw. The aperture is preferably as small as possible while still permitting the passage of the anchor block and may be too small to permit the insertion of an operator's hand, for example.

The invention may include the placement of a weatherproofing cover about the shaft to seal the first hole against the ingress of wind and rain. The weather seal may cover the aperture also. The weather seal may be applied before or after the mounting of the roof anchor to the support structure.

In another aspect of the invention, there is provided a hand tool and anchor block combination for use in mounting the roof anchor according to the method described above.

BRIEF DESCRIPTION OF THE DRAWINGS

The invention will be better understood from the following non-limiting description of an embodiment of the present invention with reference to the drawings in which:

FIG. 2 is a side view of a hand tool according to one embodiment of the invention;

FIG. 3 is a perspective view of an anchor block according to one embodiment of the invention;

DETAILED DESCRIPTION OF THE DRAWINGS

Figure 1:
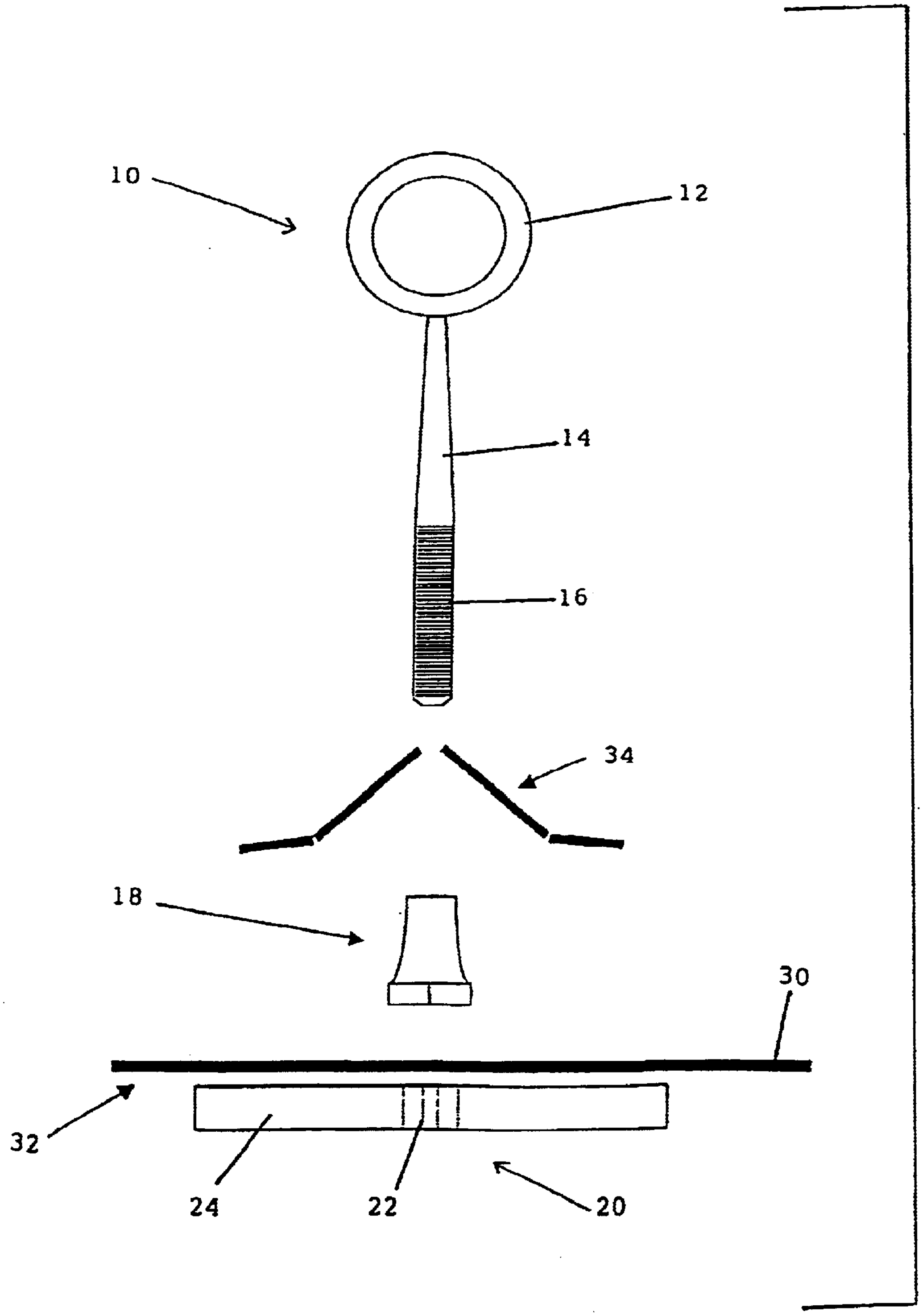
FIG. 1 is an exploded view of the roof anchor and anchor block combination according to one embodiment of the invention.

Referring to FIG. 1, there is shown a roof anchor 10 including an eyelet 12 and a shaft 14 welded at one end to the eyelet 12. The shaft 14 is tapered toward the connection with the eyelet 12 and includes a portion of constant diameter at its free end. The portion of constant diameter includes a threaded portion 16. The roof anchor 10 is threadably engageable in an anchor block 20.

The anchor block 20 includes a second hole 22 indicated in dotted outline which is adapted to threadably receive the threaded bolt portion 16 and an anchor block body 24. Prior to mounting the roof anchor 10, the anchor block 20 is located against the underside surface 32 of a C-purlin (see later).

In a preferred arrangement, a cone lock nut 18 is located as a sleeve around the shaft 14 and adds to the load braking capacity of the roof anchor 10 as described in international patent application No. PCT/AU98/00968. The cone lock nut 18 has a wide base tapering upwards towards the eyelet 12. The cone lock nut 18 may be threadably engageable to the threaded portion 16, but is preferably an unthreaded sheath with an oversized bore such that it rests on the upper surface of the covering material (not shown). Shrouding the lower portion of the shaft 14 is a weather seal 34 which provides a canopy protecting the first hole (see later) and the aperture (see later). The weather seal 34 may be made from a suitably malleable material such as lead and preferably is cone shaped to facilitate run off.

Turning to FIG. 2, there is shown a hand tool 40 including a handle portion 42, a rod portion 44 and a hook portion 46. The hook portion 46 is channel shaped and terminates in an upstanding salient 48. The salient 48 is adapted to be inserted in an oversized pivot hole 26 in the anchor block 20. The pivot hole 26 is centrally located on the block body 24 along the anchor blocks 20 centre of balance. The pivot hole 26 is oversized to enable the anchor block 20 to rotate freely about the salient 48 whereby to assume a horizontal orientation at rest.

Figure 4:
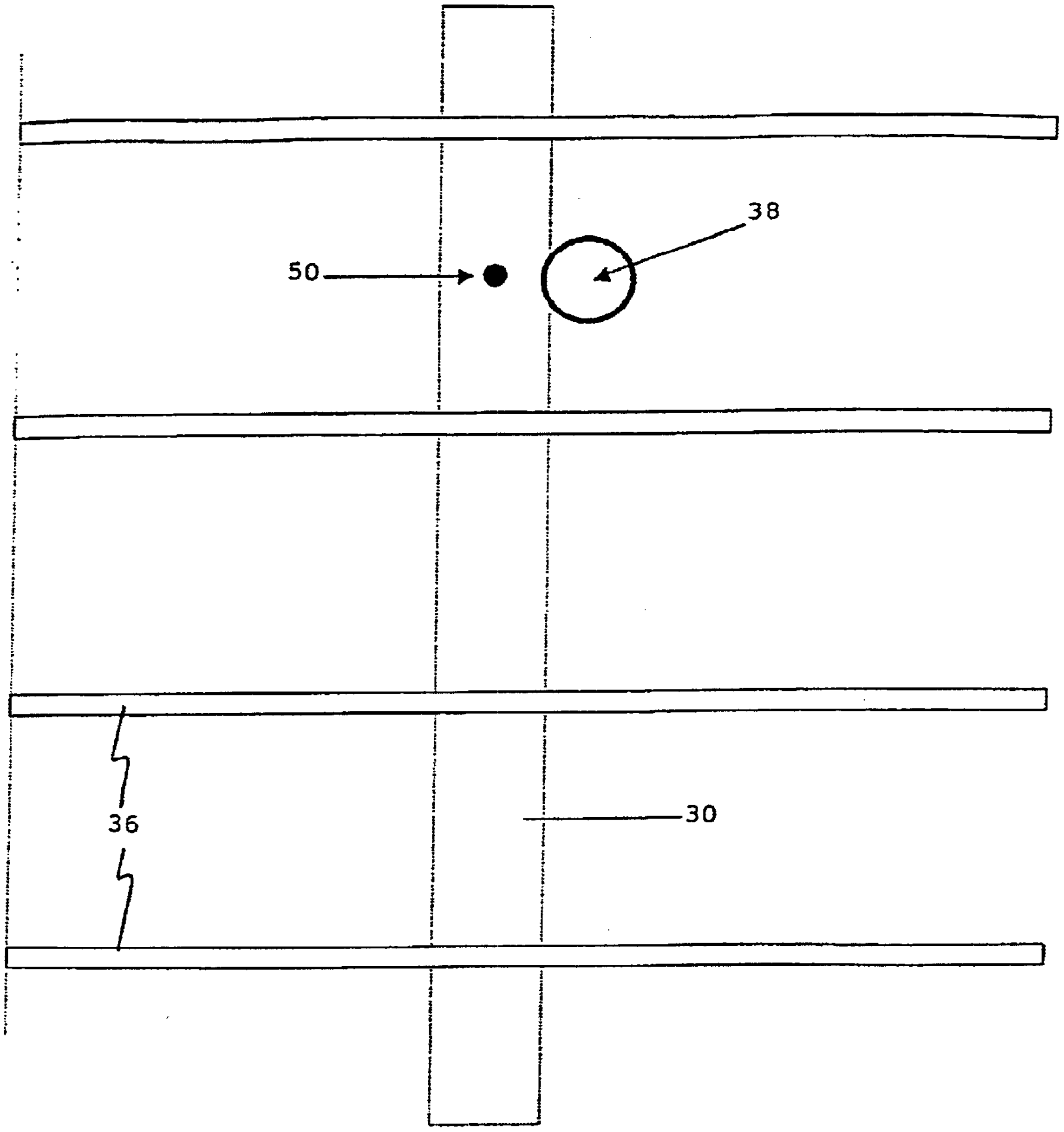
FIG. 4 is a schematic plan view of a roof structure applicable to the present invention.

With reference now to FIG. 4, there is shown a roof support framework including transfer rafters 36 supported by a C-purlin 30. The roof covering material is not shown for convenience.

According to the method of one embodiment of the invention a first hole 50 is drilled through the covering material and the C-purlin 30 at a location which it is desired to mount a roof anchor 10. Immediately adjacent the first hole 50 and the C-purlin 30 an aperture is cut in the roof covering material to provide access to the underside surface of the top arm of the C-purlin 30. Clearly it is important to locate the aperture 38 on the open side of the C-purlin 30 to enable access to the underside surface 32.

Figure 5:
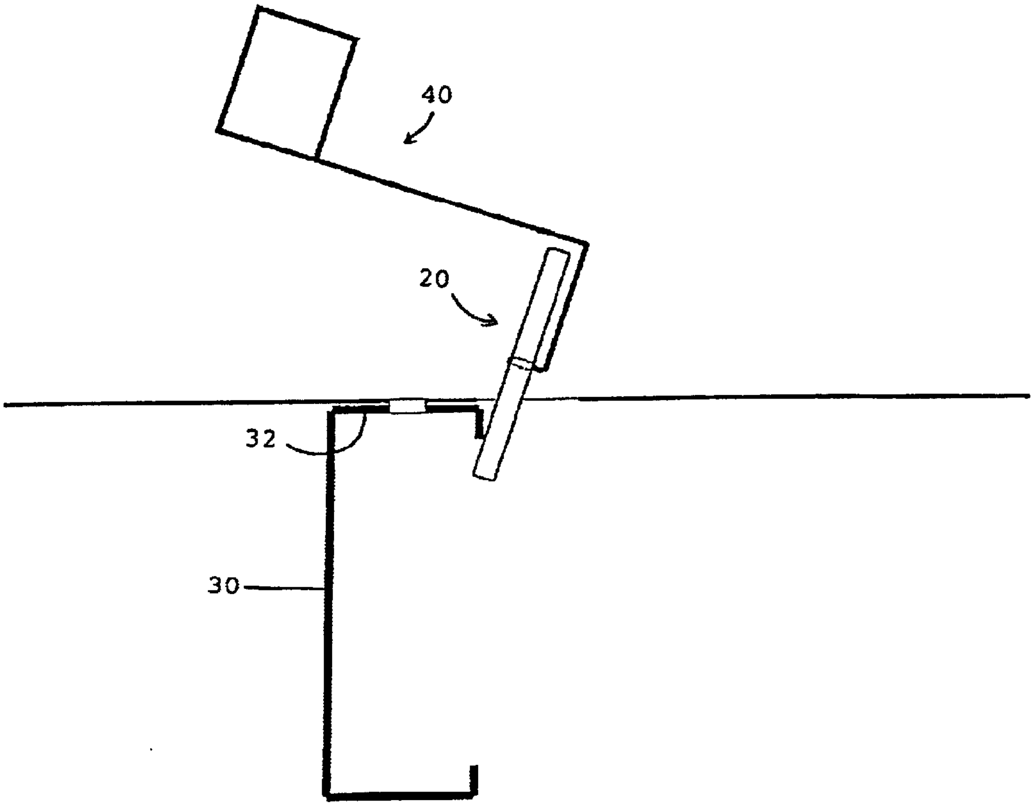
FIGS. 5 to 7 are side views of the hand tool and anchor block combination showing the method of insertion of the anchor block through the aperture and its location against the underside surface according to one embodiment of the invention.
Figure 6:
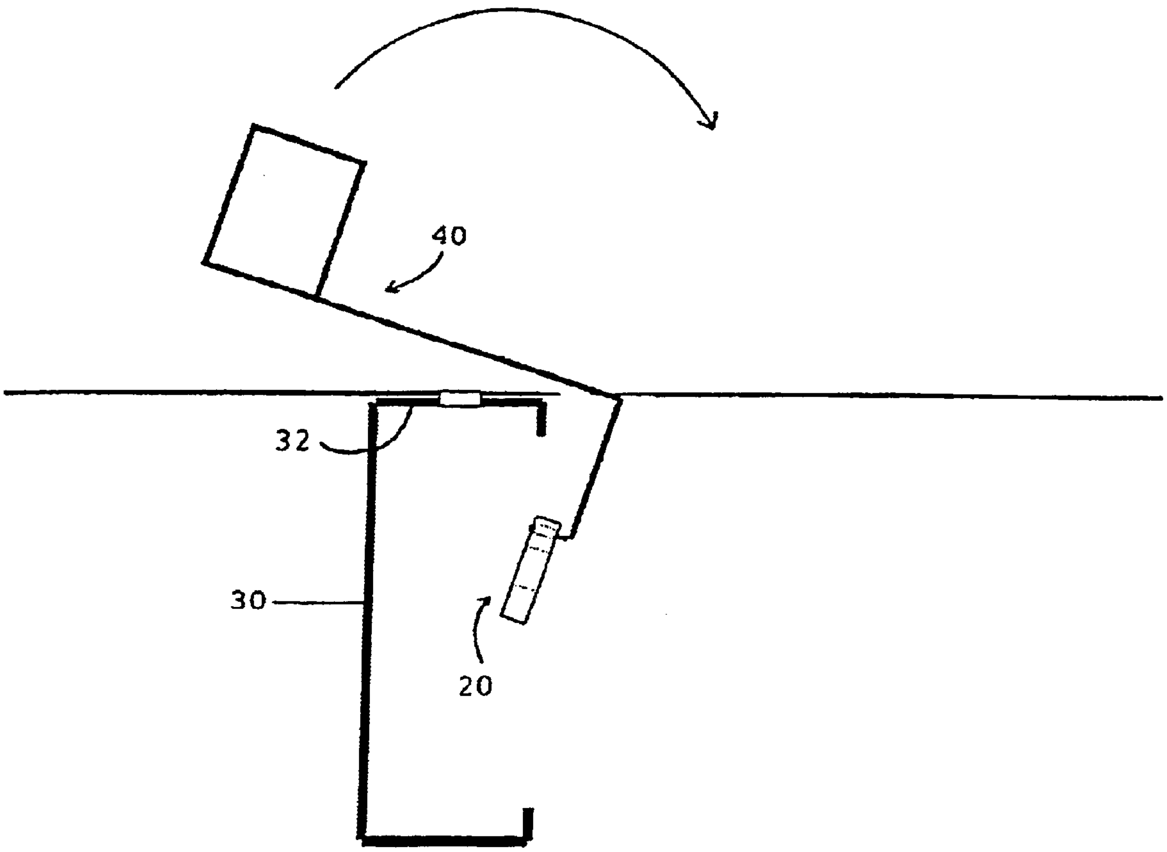
Figure 7:
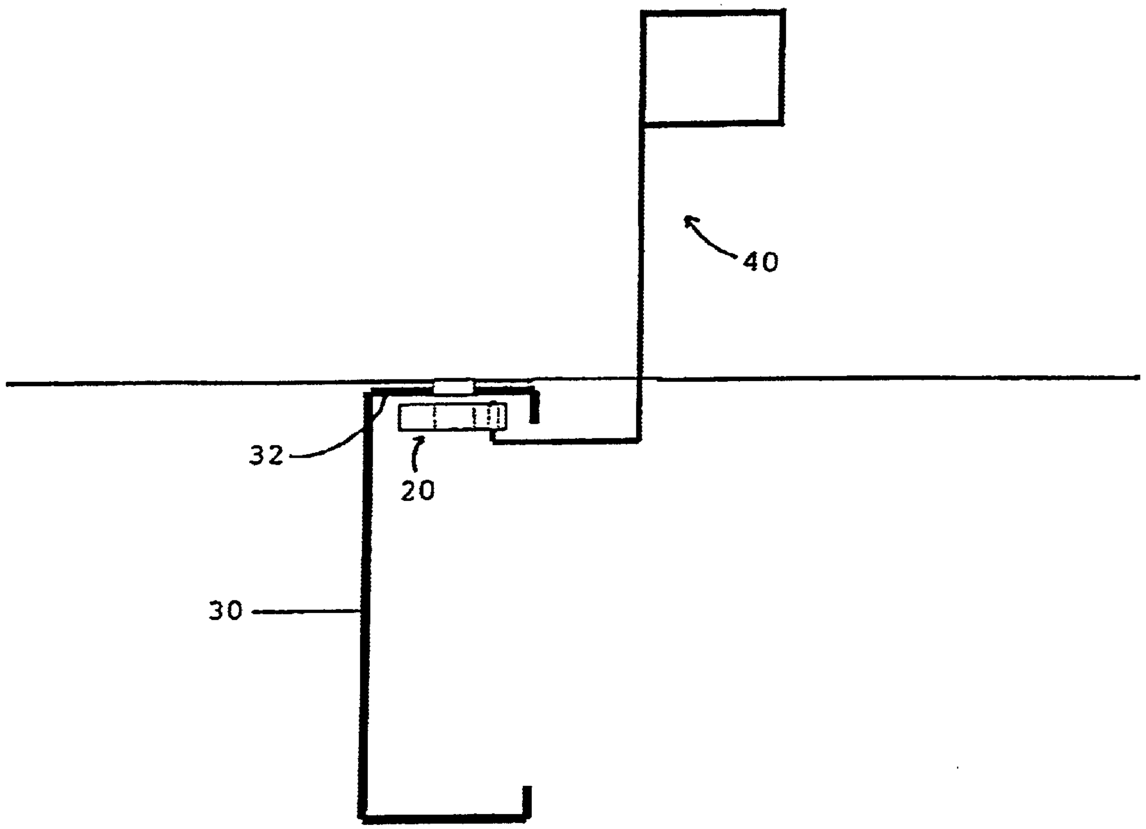

Referring now to FIGS. 5–7, the anchor block 20 is suspended on the hand tool 40 by locating the salient 48 in the pivot hole 26 such that the anchor block 20 is free to swivel thereon. The anchor block 20 is manually oriented lengthwise such that its longitudinal access is substantially vertical.

Once having cleared the aperture 38 the anchor block 20 rights itself by swivelling about the axis defined by pivot hole 26 to achieve an orientation whereby its longitudinal axis is substantially horizontal. The hand tool 40 is rotated by the operator as shown in FIG. 6 and lifted up into the cavity defined by the upper arm of the C-purlin 30 so that the anchor block 20 fits snugly against the underside surface 32 and the first and second holes are in alignment as shown in FIG. 7.

Figure 8:
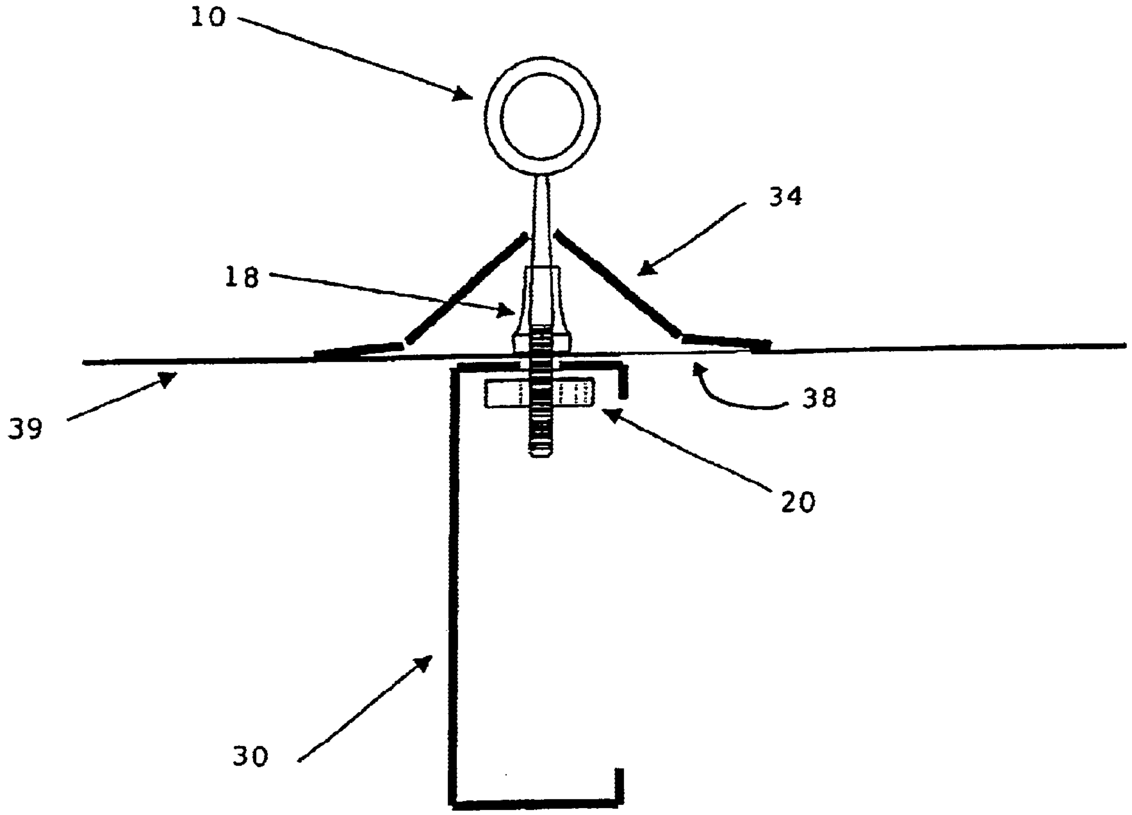
FIG. 8 is a side view of a roof anchor mounted to a roof structure.

Referring to FIG. 8, the fully mounted roof anchor 10 is shown in which the shaft 14 has been inserted through a central aperture in the weather seal 34, the cone lock nut 18 and the first hole 50 and threadably engaged in the second hole 22 of the anchor block 20. The weather seal 34 is sufficiently wide to effectively cover the aperture 38 made in the roof covering material 39.

A rope or safety harness (not shown) may then be fixedly attached to the eyelet 10 whereby to secure a worker against an inadvertent fall whilst working on the roof 39.

It will appreciated that many modifications and variations may be made to the embodiments described herein by those skilled in the art without departing from the spirit or scope of the invention.

Throughout the specification and claims the word “comprise” and its derivatives are intended to have an inclusive rather than exclusive meaning unless the context requires otherwise.

INDUSTRIAL APPLICABILITY

It will be immediately apparent to persons skilled in the art that the roof anchor may provide an anchor point for a variety of activities carried out on roofs. For example, the roof anchor may provide an anchor point for posts supporting fences or other barriers erected for the safety of workmen working on the roof or may be used to secure equipment associated with the actual work on the roof. Moreover, the roof anchor may provide an anchor point for fittings such as solar panels or water heaters required to be mounted on the roof.

What is claimed is:

1. A method for mounting a roof anchor on a roof support structure having an underside surface, the roof fully or partially covered with roof covering material, the roof anchor including an attachment means and a shaft, the method including the steps of:

a) Making a first hole in the covering material and the roof support structure, which first hole is capable of receiving the shaft;

b) Forming an aperture in the covering material adjacent the first hole and the roof support structure;

c) By a hand tool, inserting the hand tool with an anchor block, which has a second hole capable of fixedly engaging the shaft, through the aperture and locating the anchor block at the underside surface such that the first and second holes are in registry; and d) Inserting the shaft through both the first and second holes whereby to fixedly engage the roof anchor to the anchor block, such that the roof anchor is mounted on the roof support structure, and then withdrawing the hand tool from the aperture.

2. The method according to claim 1, including carrying out step c) using an elongate hand tool to control the orientation of the anchor block.

3. The method according to claim 2, including swivelling the anchor block relative to the hand tool to insert the anchor block through the aperture in one orientation and swivelling the anchor block to a second orientation after the anchor block has cleared the aperture.

4. A hand tool and anchor block combination for use in mounting the roof anchor according to the method defined in claim 1.

5. The combination according to claim 4, wherein the hand tool an elongate hand tool controlling the orientation of the anchor block.

6. The combination according to claim 4, wherein the hand tool includes a handle and an elongate rod capable of supporting the anchor block at the free end of the elongate rod.

7. The combination according to claim 6, wherein the elongate rod includes a hook end adapted to suspend the anchor block.

8. The combination according to claim 6, wherein the anchor block includes a pivot hole for loosely receiving the free end of the rod to allow the anchor block to freely rotate about the free end.

9. The combination according to claim 8, wherein the pivot hole is located at a point which is at a centre of balance of the anchor block and the anchor block assumes an orientation suitable to facilitate its placement against the underside surface.

10. The combination according to claim 6, wherein the rod terminates in a portion extending in a direction traverse to a main portion of the rod connected to the handle.

* * * * *